(12) United States Patent
Gomez

(10) Patent No.: US 6,330,221 B1
(45) Date of Patent: Dec. 11, 2001

(54) FAILURE TOLERANT HIGH DENSITY DIAL ROUTER

(75) Inventor: Rafael Gomez, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/099,877

(22) Filed: Jun. 18, 1998

(51) Int. Cl.[7] .................................................. G01R 31/08
(52) U.S. Cl. ........................ 370/217; 370/219; 370/221; 370/225
(58) Field of Search ................................. 370/216, 217, 370/219, 221, 225

(56) References Cited

U.S. PATENT DOCUMENTS

| | | | | |
|---|---|---|---|---|
| 5,301,184 | * | 4/1994 | Uriu et al. .............................. | 370/219 |
| 5,436,886 | * | 7/1995 | McGill .................................. | 370/219 |
| 5,488,606 | * | 1/1996 | Kakuma et al. ....................... | 370/219 |
| 5,712,854 | * | 1/1998 | Dieudonne et al. .................. | 370/536 |
| 5,896,370 | * | 4/1999 | Eckhoff et al. ....................... | 370/228 |

* cited by examiner

*Primary Examiner*—Hassan Kizou
*Assistant Examiner*—Thien Tran
(74) *Attorney, Agent, or Firm*—Marger Johnson & McCollom, P.C.

(57) ABSTRACT

A Fault Tolerant Dial Router (FTDR) includes redundant subsystem resources that operate independently of telephone line interface connections. The redundant resources are switched active when a failure is detected in an activated dial router subsystem. Switching out subsystem failures is fully automated under software control, providing uninterrupted service to users with limited performance loss. The FTDR includes a switching mechanism that selectively switches out the telephone interfaces or other subsystem resources inside the dial router box detected as having failures. The subsystem resources include line framers, controllers and modem modules.

18 Claims, 7 Drawing Sheets

DS1 CROSS-CONNECT SWITCH BLOCK DIAGRAM

CT3 LIU FAILURE

FAILURE TOLERANT HIGH DENSITY DIAL ROUTER

BACKGROUND OF THE INVENTION

This invention relates a high density dial router and more particularly to a Fault Tolerant Dial Router (FTDR) that can be automatically reconfigured around faults while other independently operating subsystems in the dial router continue to process calls.

A dial router processes telephone calls from a Public Service Telephone Network (PSTN). The dial router formats received telephone calls into IP packets and routs the packets over a packet-based Local Area Network (LAN) or Wide Area Network (WAN). The PSTN serially multiplexes multiple telephone calls together into either PRI, channelized T1 (CT1), or channelized T3 (CT3) data streams or the European equivalent of CT1, which are referred to as CE1. The dial router accordingly includes PR1, CT1, CE1 and/or CT3 feature boards that separate out the individual calls from the data streams. Modems extract digital data from the individual telephone line channels. The router then encapsulates the digital data into packets that are routed onto the packet-based network, such as a fast-Ethernet LAN.

Some dial router architectures break the dial router system into many very small subsystems cards. Each subsystem has a complete set of line interface units. When a failure occurs, the whole subsystem card is decommissioned and manually swapped by an operator with a standby subsystem card at a later time. Even if a line interface unit is partially operational, it is fully decommissioned if a failure is detected. Another problem is that the number of boards in the dial router are substantially increased since one redundant card is provided for each subsystem card. This redundant architecture results in large and bulky dial routers.

Current dial routers provide little or no fault tolerance against failures that occur in the field. Upon encountering a failure, field service engineers typically swap out the entire dial router box. For example, when a single modem module in the dial router fails, the entire dial router box is turned off and the modem card replaced. When the dial router is shut down, all calls coming into the dial router are disrupted. Because the dial router handles a large number of calls at the same time, any failure, no matter how small, disrupts all the information (data, voice, etc.).

Accordingly, a need remains for a simple dial router architecture that reduces the disruption of calls caused by failures.

SUMMARY OF THE INVENTION

A fault tolerant dial router (FTDR) includes redundant subsystem resources that operate independently of telephone line interface connections, such as PRI, CT1, CE1 and CT3 interfaces. The redundant subsystem resources are switched active when a failure is detected in a currently activated dial router subsystem. Subsystem failures are automatically switched out under software control, providing uninterrupted service to users with limited performance loss.

The FTDR selectively detaches the PRI, CT1 or CT3 line interfaces from the "pool" of other subsystem resources inside the dial router box. The subsystem "pool" includes line framers, controllers and modem modules. The "pool" of resources typically include some redundancy so that one extra subsystem can be standing by for a given number of active subsystems.

Failures often occur in the line interface units, especially the CT3 line interface that can handle up to 672 calls. The FTDR switches out a failed line interface unit and automatically switches in a redundant line interface unit.

The FTDR detaches the line interfaces from the "pool" of subsystem resources by using a DS1 cross-connect switch (DCCS). The PRI, CT1, CE1 or CT3 line interface units converts modem, telephone, facsimiles or other types of calls to discrete DS1 data streams. The DCCS is pre-programmed to route individual DS1 data streams to subsystems and backup subsystems in the same feature card or to subsystems in other feature cards in the FTDR. DS1 I/O lines connects together all the DCCS switches in the FTDR.

When a failure is detected anywhere in the system, the DCCS is automatically reconfigured to route the DS1 data stream around the failed subsystem to another subsystem located elsewhere in the FTDR. If more failures are detected, the DCCS connects the DS1 data stream around the new fault to another available subsystem resource. The DCCS reduces call disruptions in the dial router due to failures and requires substantially less standby hardware than other dial routers. The invention is targeted, but not limited to, dial routers. For example, the FTDR is ideal for use by Internet Service Providers (ISPs) to increase call reliability and reduce system down time.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
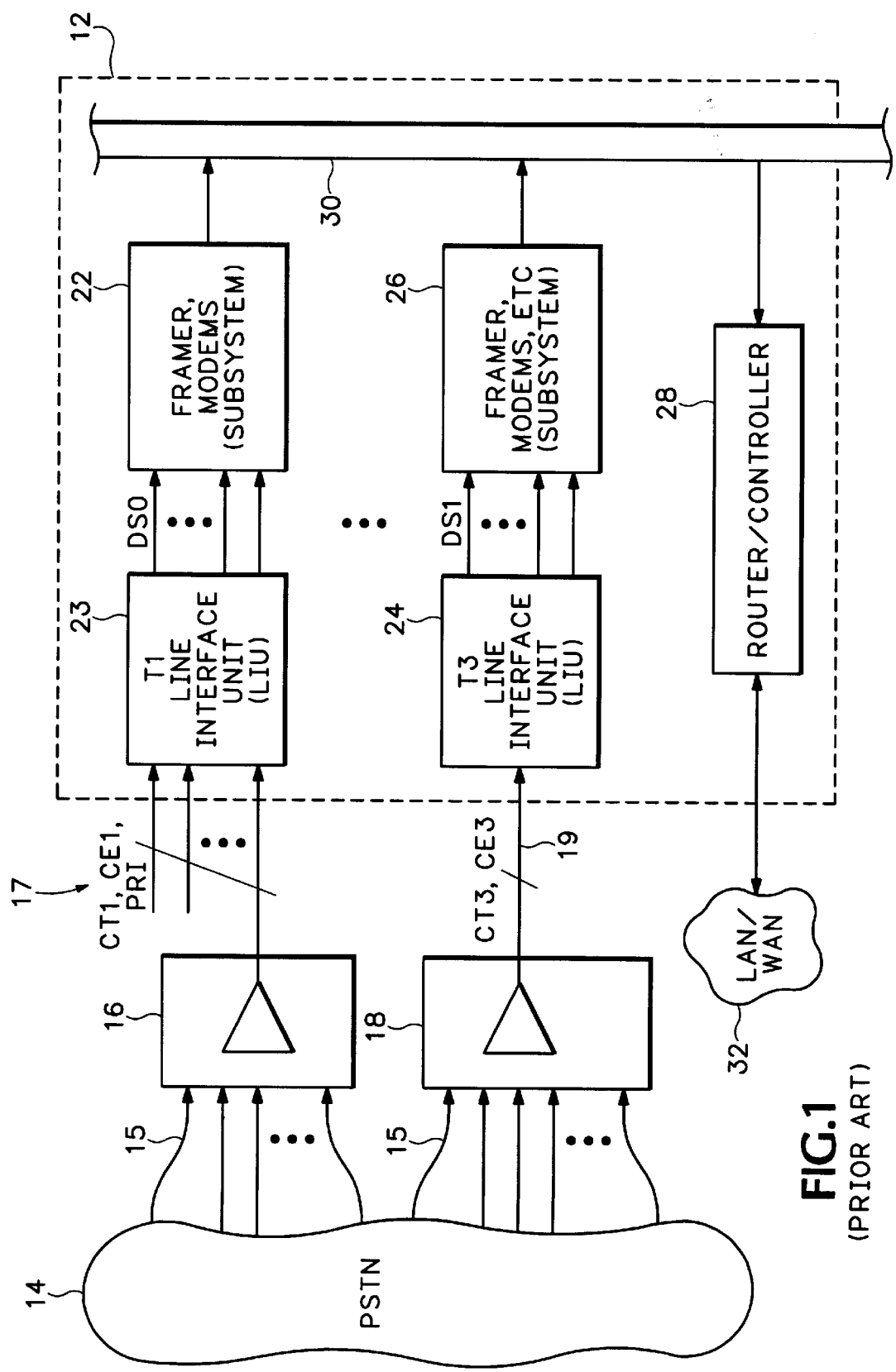
FIG. 1 is a block diagram of a prior art dial router.

FIG. 1 is a block diagram of a prior art dial router 12. Multiple telephone calls 15 in a PSTN 14 are aggregated by a multiplexer 16 into either channelized T1 (CT1) data streams or Integrated Services Digital Network (ISDN) PRI data streams. In Europe, the multiple telephone calls 15 are aggregated into channelized E1 data streams (CE1). The T1 channels are partitioned into 24 DS0 time slots that each carry a separate telephone call. More calls are aggregated together by multiplexer 18 to form a channelized T3 (CT3) data stream. The CT3 channel is partitioned into 28 DS1 time slots that each carry 24 DS0 channels. Channelized T1 has a bandwidth of 1.54 million bits per seconds (bps) and channelized T3 has a bandwidth of 45.736 million bps.

A T1 Line Interface Unit (LIU) 23 in the dial router 12 receives multiple calls on multiple T1 lines 17. A subsystem 22 includes a HDLC controller, framers and modems modules. The framer is coupled directly to the T1 LIU 23 and converts the T1 channel into separate DS0 channels. The modems in subsystem 22 extract digital data from the DS0 channel. The packets are sent from the modems in subsystem 22 over a backplane 30 to a router/controller 28 that then encapsulates the data into packets and sends the packets out a packet based network, such as a LAN or WAN 32. A T3 Line Interface Unit (LIU) 24 receives the DS1 data stream from the CT3 line 19. A framer in subsystem 26 separates the DS1 data stream into separate DS0 channels. Modem modules in subsystem 26 extract digital data from the DS0 channels. Router/controller 28 converts the digital data into packets and sends the packets out to the LAN/WAN 32.

The LIU's 23 and 24 are connected directly to the subsystems 22 and 26, respectively. Any failure in the T1 LIU 23 or associated subsystem 22 disconnects up to 30 ports (port=DS0 channel). The only way to restore service to the 30 ports is to physically replace the function card (board) containing LIU 23 and subsystem 22. If a failure occurs in the T3 LIU 24 or associated subsystem 26, even more calls are disconnected.

Figure 2:
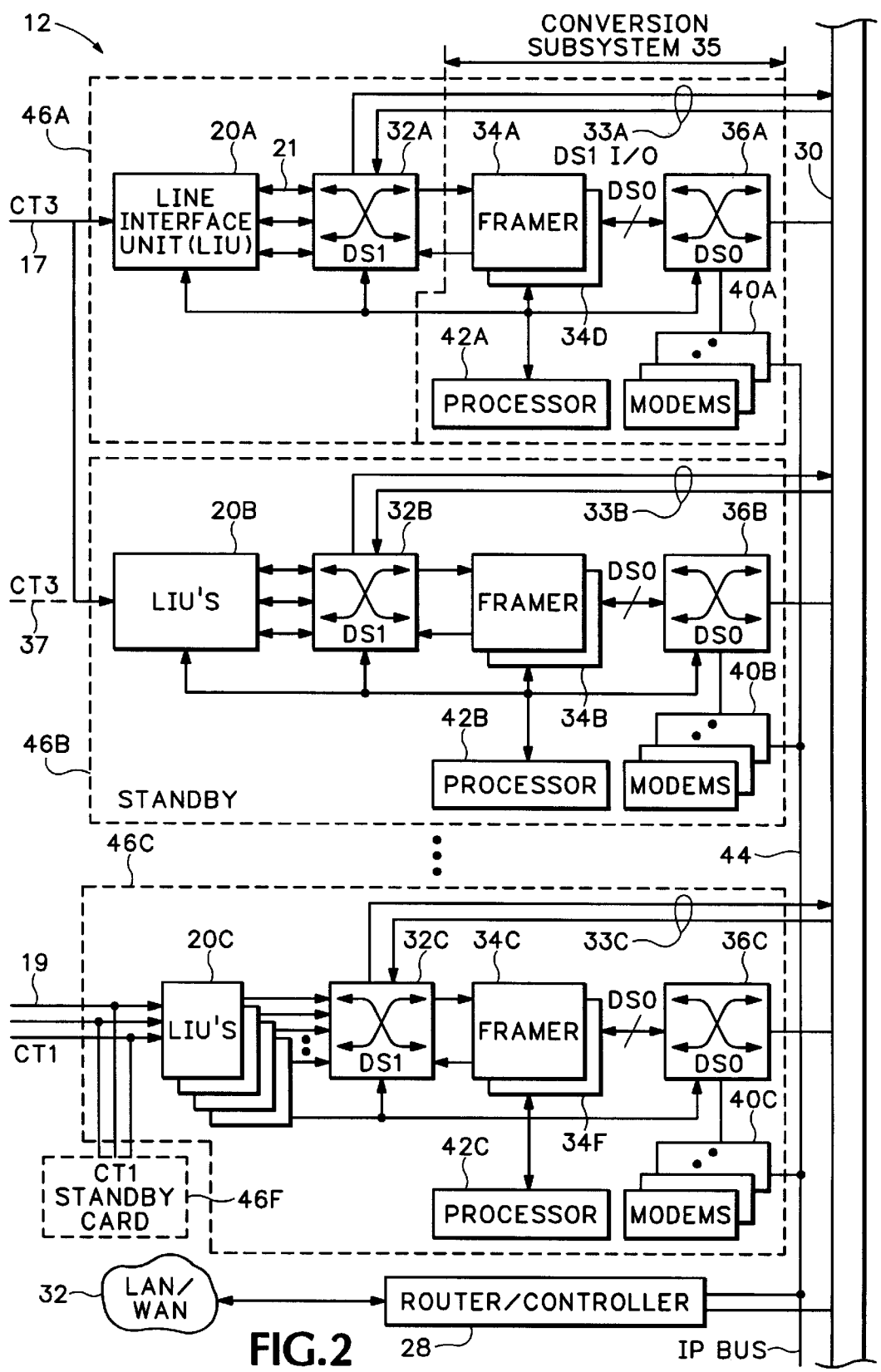
FIG. 2 is a block diagram of a Fault Tolerant Dial Router (FTDR) according to the invention.

Referring to FIG. 2, a Failure Tolerant Dial Router (FTDR) 12 according to the invention includes DS1 cross-connect switches (DCCS's) 32A–C in each feature card 46A–46C, respectively. A T3 Line Interface Unit (LIU) 20A in feature card 46A receives a CT3 line 17 and outputs DS1 data streams 21 to the DCCS 32A. Alternatively, the LIU 20A is configured to receive ISDN PRI lines. The DCCS 32A is originally configured to connect the DS1 data streams 21 to a DS1 framer 34A. The framer 34A converts the DS1 data stream into DS0 calls that are connected to modem modules 40A through a DS0 cross-connect switch 36A. The modem modules 40A extract digital data from the DS0 calls and then sends the digital data to a router/controller 28 over bus 44. DS1 I/O lines 33A are coupled from DCCS 32A to DCCS 32B and 32C on the other feature card 46B and 46C through the backplane 30. The different functional elements such as the framer 34A and modems 40A on the right side of the DCCS 32A are referred to generally as a conversion subsystem 35. A processor 42A monitors the functional elements in feature card 46A for failures.

A standby feature card 46B has the same functional elements as feature card 46A. The standby feature card 46B is coupled to the CT3 line 17 in parallel with the feature card 46A. A CT1 or PRI feature card 46C is coupled to multiple CT1 lines 19 by individual CT1 LIU modules 20C. Alternatively, the LIU modules 20C provide an interface for CE1 lines. The LIU modules 20C are coupled to a DCCS 32C. The subsystem to the right of DCCS 32C is similar to the subsystem 35 in feature card 46A. A T1 standby feature card 46F is similar to the CT1 feature card 46C and is coupled to the CT1 lines 19. The functional elements in the feature cards, other than the DCCS's 32A–C and the DS1 I/O lines 33A–C are known to those skilled in the art and are, therefore, not described in further detail.

Any combination of feature cards can be used in the FTDR 12. The configuration shown in FIG. 2 is only one implementation shown for illustrative purposes. For example, there may be multiple CT3 feature cards 46A and multiple CT1 feature cards 46C. There may be one standby feature card 46B connected in parallel to each active CT3 feature card 46A or only one standby feature card 46B used as backup for multiple CT3 feature cards 46A.

Typically there is one-to-one redundancy for the CT3 feature cards 46A. This means that there is one standby CT3 card 46B for each normally operational CT3 card 46A. This is typically less redundancy, say 7-to-1 redundancy, for the CT1 feature cards 46C. This means there is only one standby CT1 feature card 46F for 7 normally operating CT1 feature cards 46C.

Referring back to feature card 46A, if a failure occurs on the CT3 lines 17, a relay in LIU 20B (not shown) is closed connecting CT3 line 17 to LIU 20B. DCCS 32B is automatically configured to connect LIU 20B over DS1 I/O lines 33A. At the same time, the DCCS 32A in the normally active feature card 46A is reconfigured to switch out LIU 20A and switch in the DS1 I/O lines 33A.

The traffic on CT3 line 17 is in turn routed around LIU 20A to LIU 20B.

The DCCS 32B connects LIU 20B to DCCS 32A so that the traffic on CT3 line 17 goes through LIU 20B, DCCS 32B and DCCS 32A to framer 34A.

If a DS1 failure occurs in the conversion subsystem 35 (framer 34A, DS0 cross-connect switch 36A, or modem modules 40A), the DCCS 32A connects the DS1 channels either to the redundant module in the same feature card 46A or connects through the DS1 I/O lines 33A to another feature card. For example, if a fault occurs in framer 34A, the DCCS 32A can reconnect the LIU 20A to redundant framer 34D in the same feature card 46A. If both framers 34A and 34D fail, the DCCS 32A can connect the LIU 20A through DS1 I/O lines 33 and backplane 30 to DCCS 32B or DCCS 32C. The DCCS 32B or 32C connect LIU 20A to framer 34B or framer 34C in one of the other features cards 46B or 46C, respectively.

By adding the DCCS's 32A–32C and the auxiliary DS1 I/O lines 33 in the DS1 domain, reconnecting telephone channels to different feature cards is faster and easier to control. If the DCCS's 32A–32C were inserted in the DS0 domain (to the right of framers 34A–34C), the cross-connect circuitry would be more difficult to control and require more complex circuitry.

The DCCS's 32A–32C in combination with the DS1 I/O lines 33A–33C provide connectivity at the DS1 level between all the feature cards 46A–46C. A major advantage provided by the DCCS's 32A–32C is that faults in subsystem 35 can be isolated from faults in the LIU's 20A–20C. This allows a substantially greater number of reconfiguration possibilities and, as a result, more effective utilization of redundant dial router resources when a fault is detected.

Another advantage of the FTDR 12 is that more functional elements in different cards can be used to provide redundancy for faults in any other card. For example, in an alternative configuration, feature card 46B is not a standby card coupled to CT3 line 17 but an active feature card connected to a separate CT3 line 37. If the subsystem 35 in feature card 46A fails, calls on T3 line 19 can be reconnected by DCCS 32A through DS1 I/O line 33A to DCCS 32B. Redundant framer and modem modules in the feature card 46B subsystem can then be used to convert the DS1 data stream from line 17 into digital packets. Feature cards that normally operate independently can now provide additional redundancy for other feature cards.

There are two versions of the cross-connect switch. One version for the T3 feature card(s) 46A and 46B and the other version for the T1/PRI/E1 feature cards 46C and 46F. Both are functionally equivalent but the DCCS on the T3 feature cards 46A and 46B support more DS1 channels.

The DCCS's 32A–32C are typically implemented using field programmable gate arrays (FPGA's). The DCCS's 32A–32C provide a 3-way switch matrix function. The DCCS 32C cross-connects the framer 34C or redundant framer 34F to each one of six LIU's 20C on the same feature card 46C. In a second configuration, the DCCS 32C cross-connects the two framers 34C and 34F to the DS1 I/O lines 33C. In a third configuration, the DCCS 32 cross-connects the six LIU's 20C to the DS1 I/O lines 33C.

Figure 3:
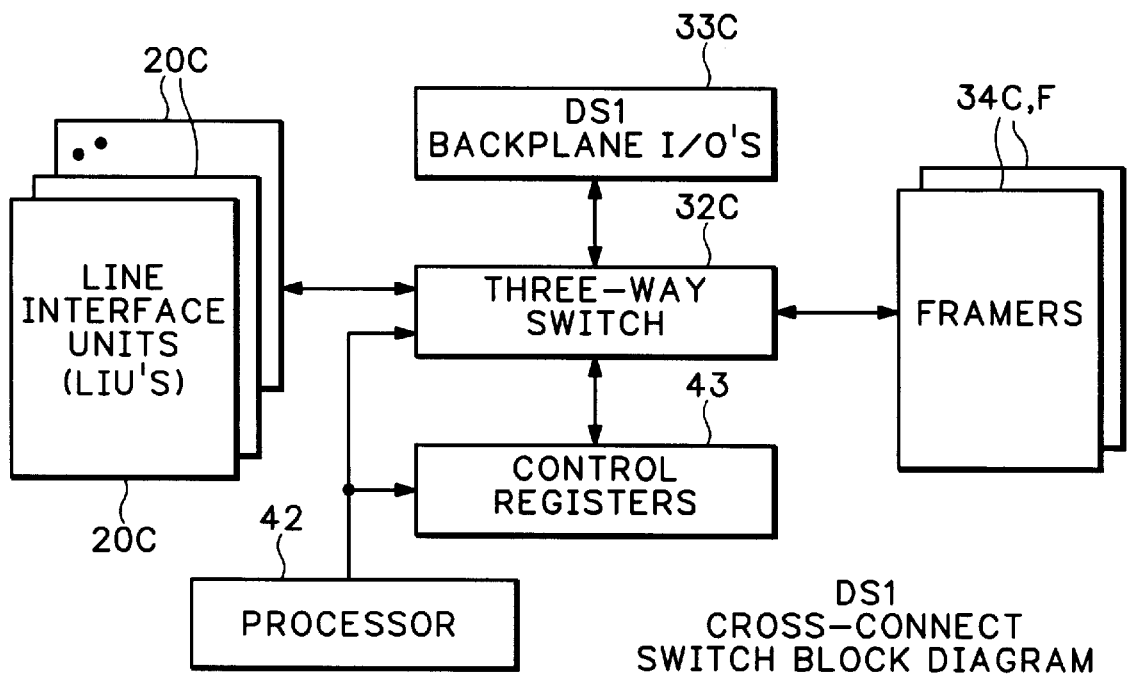
FIG. 3 is a block diagram of a DS1 cross-connect switch (DCCS) according to the invention.

FIG. 3 is a block diagram of the DCCS 32C. Each functional element including LIU's 20C, DS1 I/O lines 33C and framers 34C and 34F that connect to the DCCS 32C has 2 pair of associated signals. R_Data and R_Clock are (Receive) signals input to the DCCS 32C and T_Data and T_Clock are output (Transmit) signals. The DCCS 32C connects the different functional elements 20C, 33C, 34C, 34F and 34C together according to control registers 43 programmed by software via the processor 42.

Figure 4:
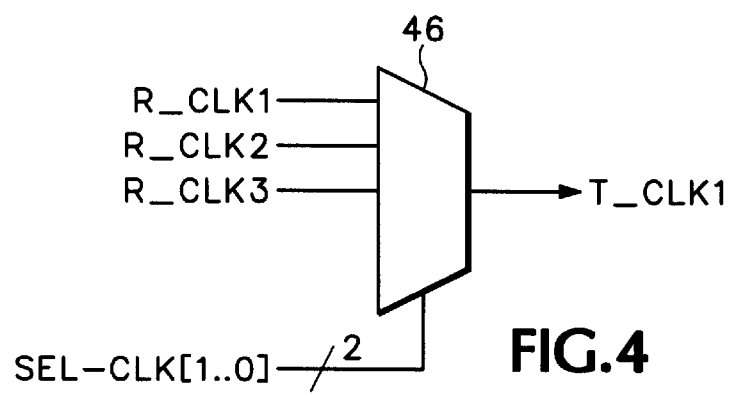
FIG. 4 is a detailed diagram of a matrix element in the DCCS shown in FIG. 3.

FIG. 4 shows a simplified implementation for a portion of the DCCS 32C used for switching the R_CLK signals received from the subsystem elements 20C, 33C and 34C. The processor 42 loads a value in one of the control registers 43 that generates clock select signal $SEL_{13}$ CLK[1 . . . 0]. The asserted SEL_CLK[1 . . . 0] signal enables a multiplexer 46 to output one of the three receive clocks R_CLK1, R_CLK2, or R_CLK3 as the T_CLK1 clock. The receive clocks are generated by the LIU 20C, backplane I/O 33C or framer 34C, respectively.

Figure 5:
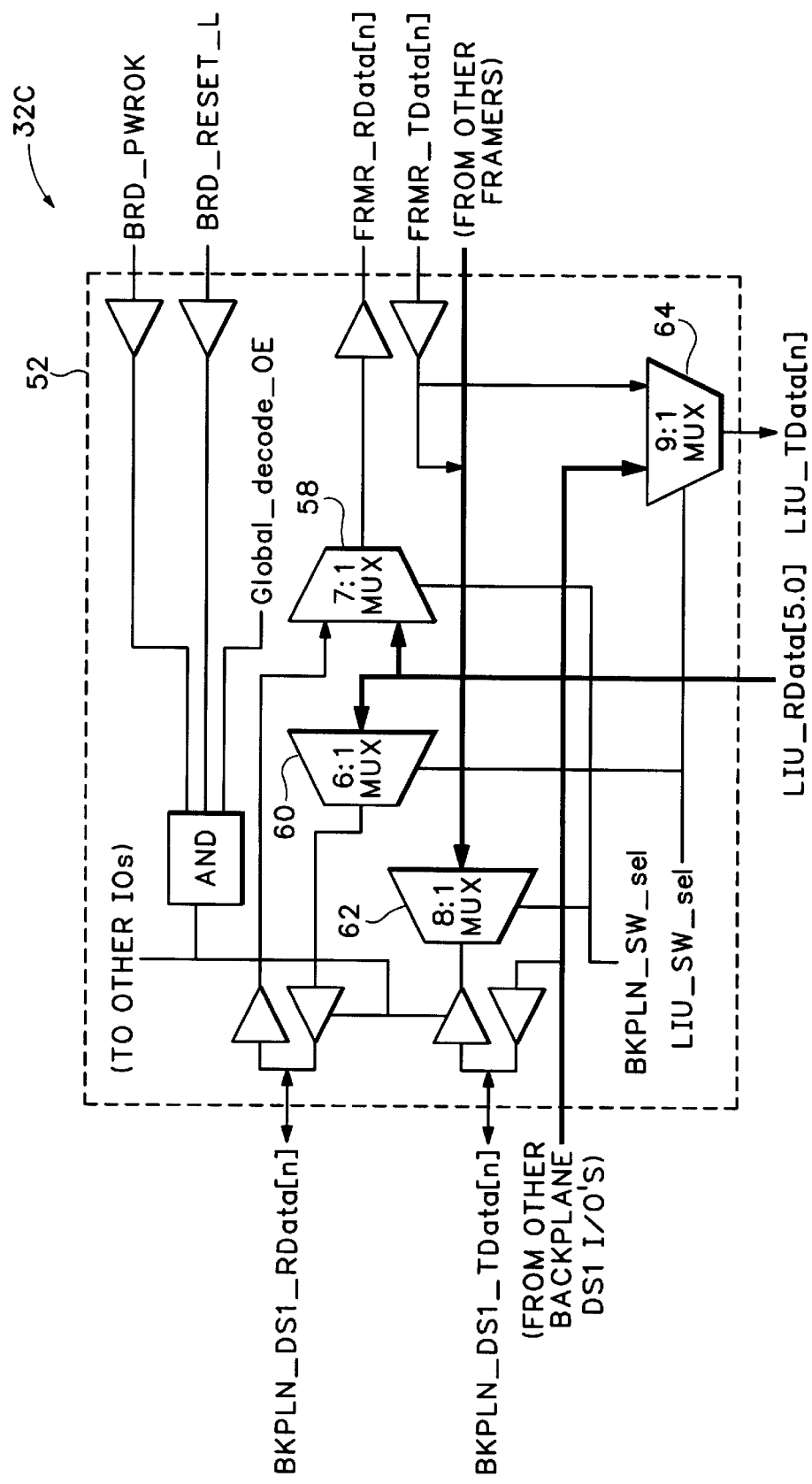
FIG. 5 is a detailed circuit diagram of the DCCS shown in FIG. 3.
Figure 5:
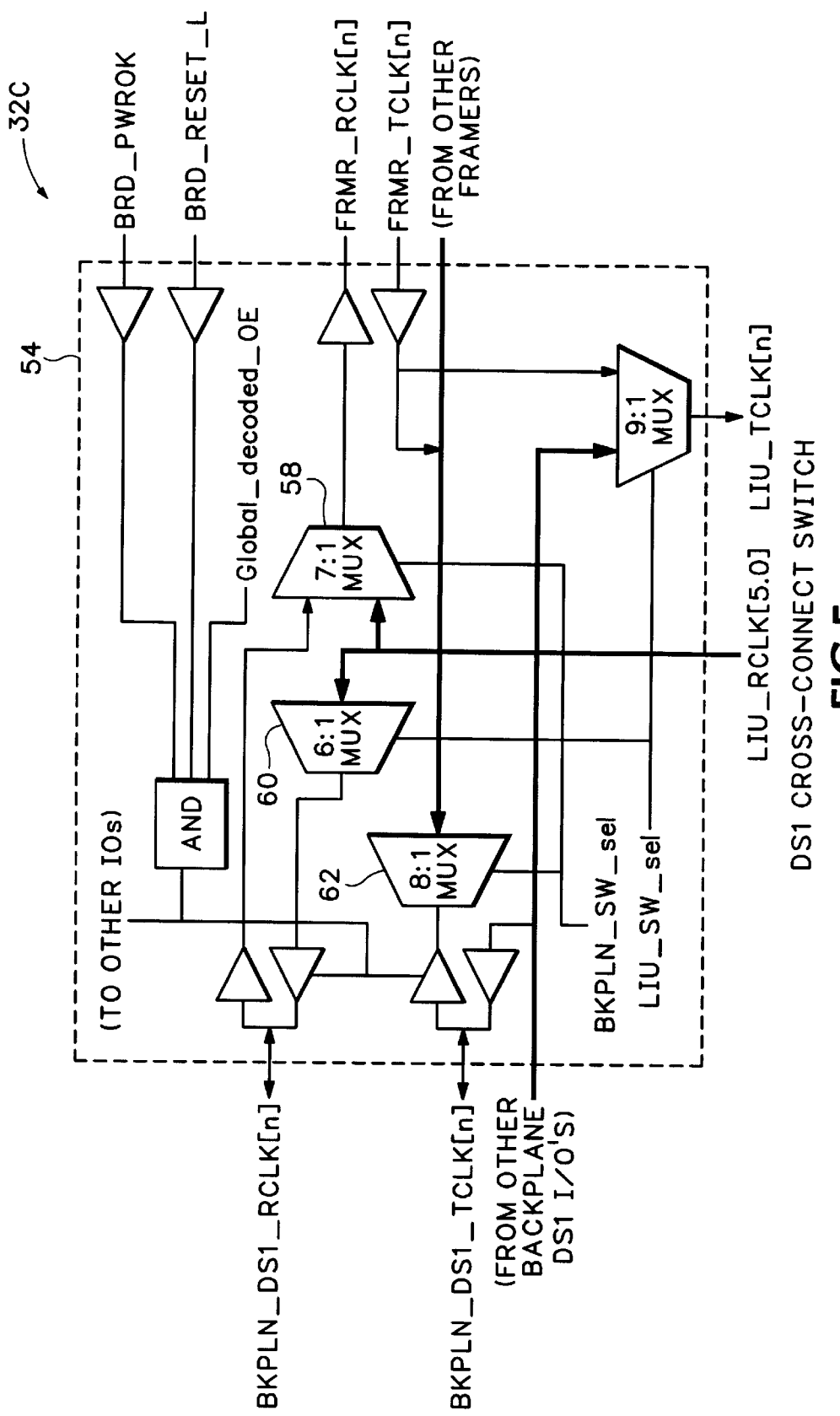

FIG. 5 is a detailed circuit diagram of the DCCS 32C. The circuit shown in FIG. 5 is replicated n times, where n is the number of inputs and outputs supported in the feature cards 46A–46C. The following terms refer to the different signals received from and transmitted by the different elements in each feature card 46A–46C.

LIU_R data[5:0]: Line Interface Unit 20C receive data;
LIU_T Data[5:0]: Line Interface Unit 20C transmit data;
LIU_RCLK[n]: Line Interface Unit 20C receive clock;
LIU_TCLK[n]: Line Interface Unit 20C transmit clock;
FRMR_RData[n]: Framer 34C receive data;
FRMR_TData[n]: Framer 34C transmit data;
FRMR_RCLK[n]: Framer 34C receive clock;
FRMR_TCLK[n]: Framer 34C transmit clock;
BKPLN_DS1_RData[n]: Backplane DS1 I/O 33C receive data;
BKPLN_DS1_TData[n]: Backplane DS1 I/O 33C transmit data;
BKPLN_DS1_RCLK[n]: Backplane DS1 I/O 33C receive clock.
BKPLN_DS1_TCLK[n]: Backplane DS1 I/O 33C transmit clock.

The upper block in FIG. 5 shows DCCS 32C data control circuitry 52 and the lower block in FIG. 5 shows DCCS 32C clock control circuitry 54. Power and reset signals BRD_PWROK, BRD_RESET_L and Global_decoded_OE are used for resetting and enabling the DCCS 32C. A multiplexer (mux) 58 outputs either the BKPLN_DS1_R or LIU_R receive signal as the FRMR_R Data[n] signal to the framer 34C. A mux 60 selects one of the LIU_RData[5:0] signals for outputting as the BKPLN_DS1_RData[n] signal. A mux 62 selects one of the FRMR-Data[n] signals for outputting as the BKPLN_TData[n] signal. The clock circuitry 54 works in a similar manner for the clock signals switched between the different functional elements in the feature card 46C.

Figure 6:
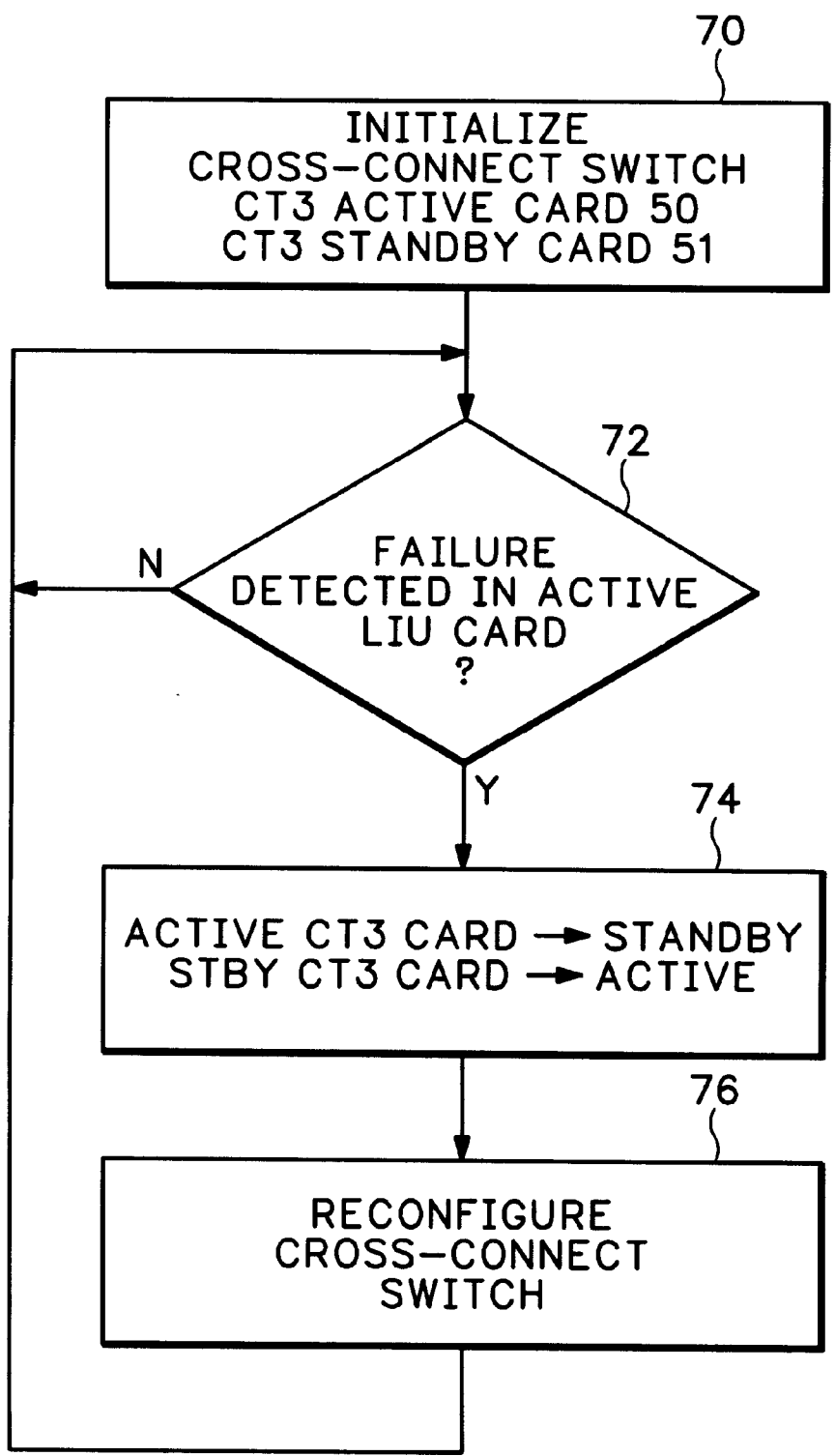
FIG. 6 is a flow diagram showing how the DCCS is reconfigured for a line interface failure.

FIG. 6 shows how the DCCS 32A is reconfigured for a CT3 line failure in the feature card 46A (FIG. 2). In step 70 the feature card 46A is activated while the standby feature card 46B remains in a standby mode. The activate feature card 46A is continuously monitored by processor 42A for any line failures in LIU 20A. If a failure is detected in LIU 20A, the processor 42A reports the fault to controller 28. The standby LIU 20D can be activated, if available. If a standby LIU 20D is not available, controller 28 in step 74 deactivates the active feature card 46A and activates the standby feature card 46B. The DCCS 32A is then reconfigured in step 76 to receive the DS1 channels from the now active feature card 46B over the DS1 I/O lines 33A. The subsystem 35 in feature card 46A then converts the DS1 data stream into digital packets. Alternatively, the DCCS 32B and subsystem in card 46B is used for converting the CT3 calls into packets.

Figure 7:
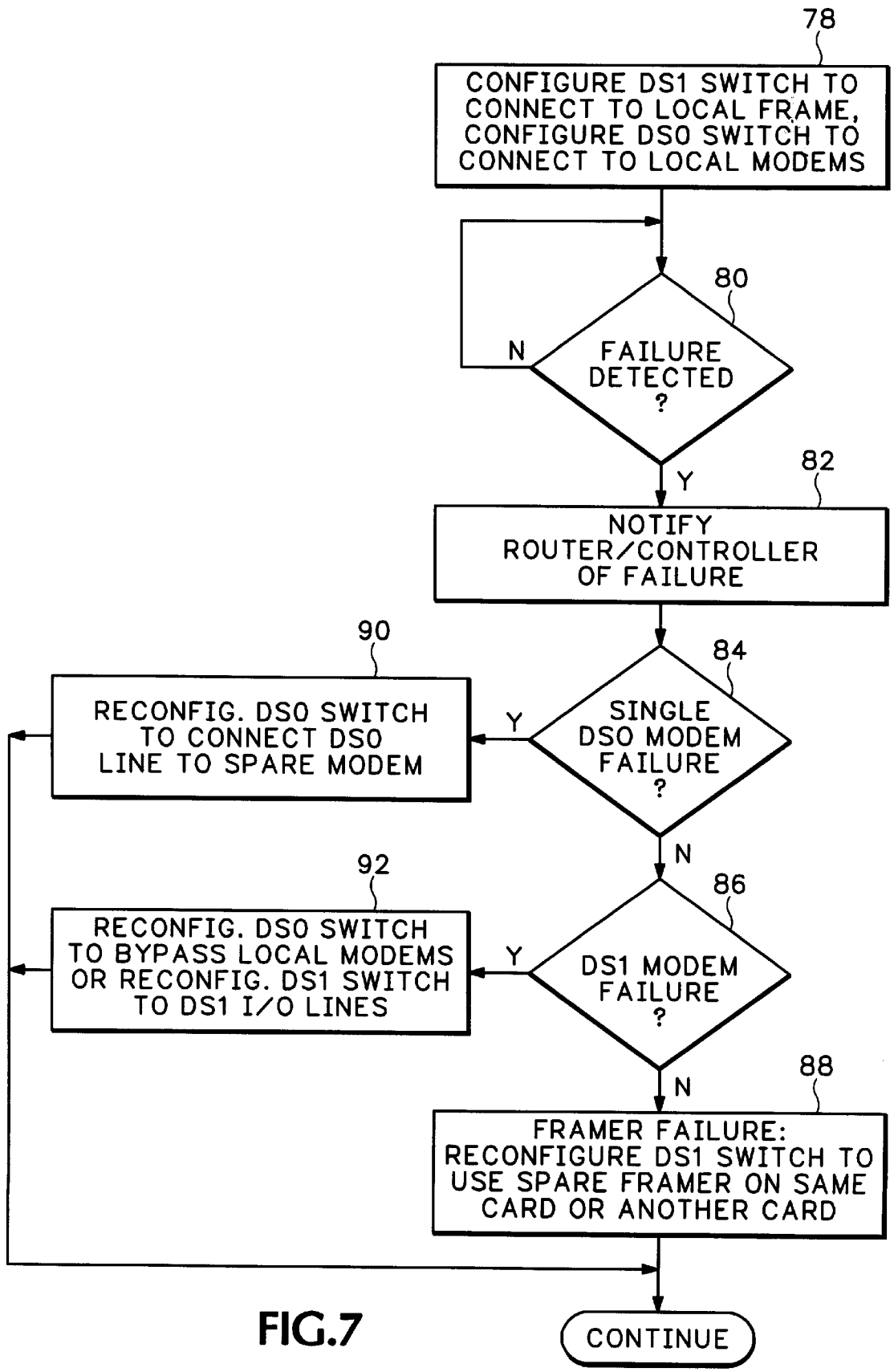
FIG. 7 is a flow diagram showing how the DCCS is reconfigured for a subsystem failure.

FIG. 7 shows how the DCCS 32A is configured for a failure that occurs in the subsystem 35 to the right of DCCS 32A. For example, a failure that occurs in the framer 34A or in one or more of the modem modules 40A. The DCCS 32A is configured in step 78 to connect the LIU 20A to framer 34A. The DS0 switch 36A is configured to connect the DS0 calls from framer 34A to the modem modules 40A. If a failure is detected in decision step 80, the router/controller 28 is notified by the local processor 42 in step 82.

If the failure is a DS0 modem failure, the DS0 switch 36A can be reconfigured in step 90 to connect the DS0 calls to spare modem modules 40A in step 90. If a DS1 modem failure is identified in decision step 86, then the entire bank of modem modules 40A have failed. The DS0 switch 36A is then reconfigured to by-pass all the local modem modules 40A in step 92. Alternatively, step 92 reconfigures the DCCS 32A to bypass framer 34A and modem modules 40A altogether and connects the LIU 20A through the DS1 I/O lines 33 to another feature card. If a failure is detected in framer 34A, step 88 reconfigures the DCCS 32A to bypass the framer 32A and connects the LIU 20A either to the spare framer 34D on the same feature card 46A or to a framer on another feature card via DS1 I/O lines 33A.

As mentioned above, the DCCS provides a wide variety of different dial router configurations that isolate faults without having to shut down the entire dial router 12. Because more dial configurations are possible, more redundancy is provided while using less hardware. Thus, the dial router is more fault tolerant.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A fault tolerant dial router, comprising:
   a primary line interface unit coupled to telephone lines from a telephone network;
   a primary conversion subsystem converting calls on the telephone lines into packets;
   a router routing the packets on a packet based network; and
   a primary cross-connect switch coupled between the primary line interface unit and the primary conversion subsystem that reconnects the primary line interface unit to a secondary conversion subsystem when a failure is detected in the primary subsystem, the primary cross-connect switch also configurable to switch around a failed primary line interface unit while maintaining operation of the primary conversion subsystem connected to the failed primary line interface unit by disconnecting the primary line interface unit from the primary conversion subsystem and connecting a secondary line interface unit to the primary conversion subsystem.

2. A dial router according to claim 1 including a secondary cross-connect switch in a secondary feature card, the secondary cross-connect switch coupled between a secondary line interface unit and a secondary conversion subsystem, the primary cross-connect switch configurable to connect either one of the primary line interface unit and the primary conversion subsystem to the secondary cross-connect switch and the secondary cross-connect switch configurable to connect either one of the secondary line interface unit and secondary conversion subsystem to the primary cross-connect switch.

3. A dial router according to claim 2 wherein the secondary line interface unit is coupled in parallel with the primary line interface unit to the telephone lines, the primary line interface unit automatically deactivated and the secondary line interface unit automatically activated when a failure is detected on the primary line interface unit and the primary and secondary cross-connect switch automatically reconfiguring to connect the secondary line interface to the primary conversion subsystem.

4. A dial router according to claim 1 wherein the primary conversion subsystem includes a framer for framing multiple groups of telephone calls into individual telephone calls and modem modules for converting the individual telephone calls into packets.

5. A dial router according to claim 4 including a DS0 cross-connect switch redirecting individual DS0 calls from individual failed modem modules to individual standby modems and the primary cross-switch comprising a switch redirecting groups of DS1 calls from failed framers or failed banks of modems to secondary framers or secondary banks of modems.

6. A dial router according to claim 1 including multiple feature cards each having a cross-connect switch connected between a line interface unit and a conversion subsystem, the cross-connect switches in the feature cards all connected together for connecting the line interface unit in any feature card to the conversion subsystem in any other feature cards.

7. A dial router according to claim 6 wherein at least one of the feature cards receives and converts between channelized T1 telephone calls and network IP packets and at least one of the feature cards converts between channelized T3 telephone calls and network IP packets.

8. A dial router according to claim 6 including a processor on each feature card that monitors for failures and a central controller that reconfigures the cross-connect switches on each feature card according to the monitored failures.

9. A dial router according to claim 1 wherein the primary line interface unit includes multiple line interface modules each connected to a separate T1 telephone line.

10. A cross-connect switch for reconfiguring different functional elements in a dial router, comprising:

a first interface coupled to a telephone line interface unit that receives telephone line signals;

a second interface coupled to a framer that frames the telephone line signals into individual telephone calls;

a third interface coupled to another framer in the dial router and to another telephone line interface unit;

the first interface disconnecting the telephone line interface unit from the framer unit and the third interface then automatically connecting the other telephone line interface unit to the framer when the telephone line interface unit fails.

11. A cross-connect switch according to claim 10 including:

a first multiplexer selectively coupling inputs from either one of the second and third interface to the first interface;

a second multiplexer selectively coupling inputs from either one of the first or third interface to the second interface, and a third multiplexer selectively coupling inputs from either one of the first and second interface to the third interface.

12. A cross-connect switch according to claim 11 including a configuration register that configures which interface is output from each multiplexer.

13. A method for increasing fault tolerance in a telephone line concentrator, comprising:

activating line interface units for receiving telephone call data streams from a telephone network;

activating subsystems for separating the data streams on the telephone lines into separate telephone channels and extracting digital data from the channels;

converting the digital data into packets and routing the digital packets on a packet based network;

monitoring the line interface units and subsystems for failures; and automatically reconfiguring the concentrator to reconnect telephone signals around any one of the monitored line interface units and subsystems having a detected failure while keeping any remaining operating line interface units and operating subsystems available for continued processing of the telephone call data stream by disconnecting a failed one of the line interface units from an operating one of the subsystems and reconnecting the operating one of the subsystems to a different one of the operating line interface units.

14. A method according to claim 12 including reconfiguring the concentrator to reconfigure the telephone data stream around individual failed modem modules in the subsystem while remaining modem modules convert the telephone calls into digital packets.

15. A method according to claim 14 including reconfiguring the concentrator to reconnect the telephone data stream around an entire bank of modem units or around a framer in the subsystem identified as causing call failures while the line interface unit continues to receive calls from the telephone network.

16. A computer-readable medium containing software for handling fault tolerance in a telephone line concentrator, comprising:

code for activating line interface units for receiving telephone call data streams from a telephone network;

code for activating subsystems for separating the data streams on the telephone lines into separate telephone channels and extracting digital data from the channels;

code for converting the digital data into packets and routing the digital packets on a packet based network;

code for monitoring the line interface units and subsystems for failures; and code for automatically reconfiguring the concentrator to reconnect telephone signals around any one of the monitored line interface units and subsystems having a detected failure while keeping any remaining operating interface units and subsystems available for continued processing of the telephone call data stream by disconnecting a failed one of the line interface units from an operating one of the subsystems and reconnecting the operating one of the subsystems to a different one of the operating line interface units.

17. A computer-readable medium according to claim 16 including code for reconfiguring the concentrator to reconfigure the telephone data stream around individual failed modem modules in the subsystem while remaining modem modules convert the telephone calls into digital packets.

18. A computer-readable medium according to claim 17 including code for reconfiguring the concentrator to reconnect the telephone data stream around an entire bank of modem units or around a framer in the subsystem identified as causing call failures while the line interface unit continues to receive calls from the telephone network.

* * * * *

UNITED STATES PATENT AND TRADEMARK OFFICE
CERTIFICATE OF CORRECTION

PATENT NO.   : 6,330,221 B1
DATED        : December 11, 2001
INVENTOR(S)  : Gomez It is certified that error appears in the above-identified patent and that said Letters Patent is hereby corrected as shown below:

Column 5,
Line 14, "signal SEL13 CLK[1 ...0]." should read -- signal SEL_CLK[1.. 0]. --.
Line 53, "the FRMR-Data[n] signals" should read -- the FRMR_Data[n] signals --.

Signed and Sealed this

Sixth Day of April, 2004

JON W. DUDAS
*Acting Director of the United States Patent and Trademark Office*